US010277444B2

(12) United States Patent
Agon (10) Patent No.: US 10,277,444 B2
(45) Date of Patent: Apr. 30, 2019

(54) SYSTEM AND METHOD FOR CONSTRAINED PEAK CANCELLATION (71) Applicant: Apple Inc., Cupertino, CA (US)

(72) Inventor: Zohar Agon, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/645,215

(22) Filed: Jul. 10, 2017

(65) Prior Publication Data
US 2018/0091348 A1 Mar. 29, 2018

Related U.S. Application Data (60) Provisional application No. 62/398,715, filed on Sep. 23, 2016.

(51) Int. Cl.
H04L 5/00 (2006.01)
H04L 27/26 (2006.01)

(52) U.S. Cl.
CPC ........ H04L 27/2623 (2013.01); H04L 5/0062 (2013.01); H04L 27/2647 (2013.01)

(58) Field of Classification Search
CPC ................. H04L 25/0205; H04L 25/00; H04L 27/26478; H04B 7/0413
See application file for complete search history.

(56) References Cited

U.S. PATENT DOCUMENTS

| 7,995,975 B2 * | 8/2011 | Sundstrom | H04L 27/2624 455/116 |
| 2004/0165524 A1 * | 8/2004 | Chen | H04L 27/2623 370/208 |
| 2009/0323857 A1 * | 12/2009 | Singh | H04L 27/2624 375/297 |
| 2016/0028574 A1 * | 1/2016 | Wang | H04L 27/367 375/296 |

OTHER PUBLICATIONS

Aggarwal, A. et al. "Computing the Optimal Amount of Constellation Distortion in OFDM Systems", Proc. Of IEEE ICC, 2007, pp. 2918-2923.

(Continued)

Primary Examiner — Shuwang Liu
Assistant Examiner — Gina M McKie
(74) Attorney, Agent, or Firm — Sterne, Kessler, Goldstein & Fox P.L.L.C.

(57) ABSTRACT

Embodiments include a method, computer program product, and system for utilizing a system for peak cancellation for a received Orthogonal Frequency Division Multiplexing (OFDM) symbol to reduce the peak-to-average power ratio (PAPR). The system detects M sets of clipping noise samples of the symbol where each set includes one of the M highest clipping noise peaks of the symbol, determines cancellation pulses that correspond to the highest clipping noise peaks of the M sets in the time domain, and subtracts the cancellation pulses from the corresponding highest clipping noise peak samples to reduce the PAPR. The cancellation pulses are determined at least in part from the center-of-mass of each set of the clipping noise samples, the phase of some samples of each set, and the in-band energy limitation associated with the OFDM symbol.

20 Claims, 7 Drawing Sheets (56) References Cited

OTHER PUBLICATIONS

Brandwood, D.H., "A complex gradient operator and its application in adaptive array theory", *IEE Proceedings Pts. F and H (Microwaves, Optics, and Antennas)*, vol. 130, No. 1, Feb. 1983, pp. 11-16.
Devlin, C.A. et al., "Gaussian Pulse Based Tone Reservation for Reducing PAPR of OFDM Signals", *Proc. IEEE 65th Vehicular Technology Conference*, 2007, pp. 3096-3100.
Devlin, C.A. et al., "Peak to Average Power Ratio Reduction Technique for OFDM Using Pilot Tones and Unused Carriers", *Proc. IEEE Radio and Wireless Symposium*, 2008, pp. 33-36.
Gatherer, A. and Polley, M., "Controlling Clipping Probability in DMT Transmission", *Proc. 31st Asimolar Conference on Signals, Systems, and Computers*, Nov. 1999, pp. 1076-1079.
Rahmatallah, Y. and Mohan, S., "Peak-To-Average Power Ratio Reduction in OFDM Systems: A Survey and Taxonomy", *IEEE Communications Surveys & Tutorials*, vol. 15, No. 4, Fourth Quarter 2013, pp. 1567-1592.
Tellado, J. and Cioffi, J.M., "Peak Power Reduction for Multicarrier Transmission", *Proc. IEEE Global Communications Conference*, Nov. 1998, 6 pages.
Wang, L. and Tellambura, C., "Analysis of Clipping Noise and Tone Reservation Algorithms for Peak Reduction in OFDM Systems", *IEEE Transactions on Vehicular Technology*, vol. 57, No. 3, May 2008, pp. 1675-1694.

\* cited by examiner

SYSTEM AND METHOD FOR CONSTRAINED PEAK CANCELLATION

CROSS-REFERENCE TO RELATED APPLICATIONS

This application claims priority to U.S. Provisional Application No. 62/398,715, filed Sep. 23, 2016, entitled System and Method for Constrained Peak Cancellation which is incorporated herein by reference in its entirety.

BACKGROUND

Field

The described embodiments generally relate to techniques for transmitters employed to translate information into electro-magnetic waves.

Related Art

Orthogonal Frequency Division Multiplexing (OFDM) is a digital transmission technique where a given channel bandwidth is divided into subchannels and individual digital signaling tones are transmitted over each subchannel concurrently in time. The transmitted tones together may have a large peak-to-average power ratio (PAPR) in the time-domain, which requires linear and thus lower efficiency amplifiers to be used.

SUMMARY

The described embodiments include a method, computer program product, and system for peak cancellation for an Orthogonal Frequency Division Multiplexing (OFDM) symbol to reduce the peak-to-average power ratio (PAPR). The system detects M sets of clipping noise samples of the symbol where each set includes one of the M highest clipping noise peaks of the symbol, determines cancellation pulses that correspond to the highest clipping noise peaks of the M sets in the time domain, and subtracts the cancellation pulses from the corresponding highest clipping noise peak samples to reduce the PAPR. The cancellation pulses are determined at least in part from the center-of-mass of each set of the clipping noise samples, the phase of some samples of each set, and the in-band energy limitation associated with the OFDM symbol.

Some embodiments may include receiving an OFDM symbol from an inverse fast Fourier transform (IFFT) for example, identifying a set of samples of the received OFDM symbol whose amplitudes surpass a settable amplitude threshold value by a peak margin. Some embodiments also include determining a cancellation pulse for a set of M sets of clipping noise samples based at least in part on a center-of-mass of the set, the phase of some samples of the set, and the in-band energy constraint, and subtracting the cancellation pulse from the received OFDM symbol, where the difference reduces the PAPR of the OFDM symbol. The in-band energy constraint may include an error vector magnitude (EVM). Some embodiments also include a bank of possible pulses built on the subcarriers of the OFDM symbol, each with a different spectral characteristic, and which may be cyclically shifted to the location of the clipping noise sets to create the cancellation pulse.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference number s indicate identical or functionally similar elements. Additionally, generally, the left-most digit(s) of a reference number identifies the drawing in which the reference number first appears.

DETAILED DESCRIPTION

A disadvantage of the OFDM transmission scheme is that the time-domain waveform may have a large peak-to-average power ratio (PAPR) which requires linear and consequently, inefficient amplifiers. Peak cancellation for reducing PAPR in Orthogonal Frequency Division Multiplexing (OFDM) signals has limited efficiency for a high clipping rate transmission (e.g., at small back-off transmissions) because the available subcarriers are out-of-band, while much of the clipping noise power is at frequencies of the data-carrying subcarriers. Some embodiments further described below employ data carrying subcarriers to reduce the PAPR, while controlling the induced distortion.

Figure 1:
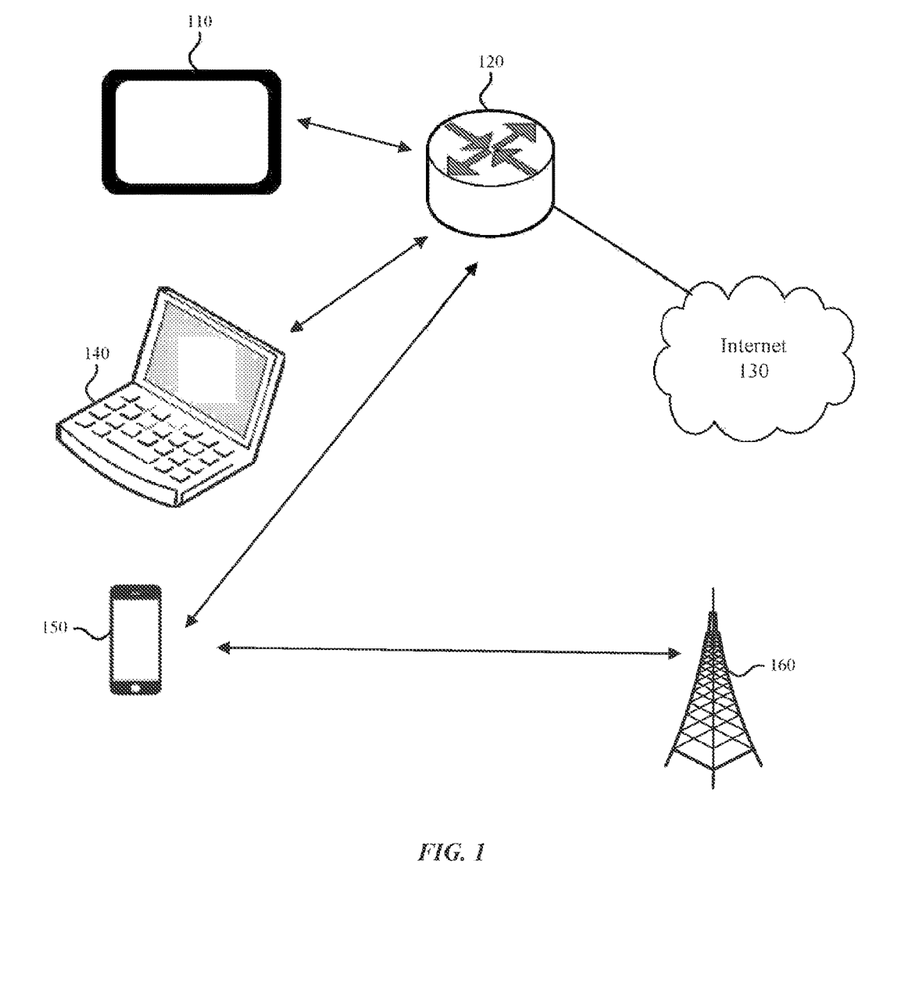
FIG. 1 illustrates an example system implementing constrained peak cancellation, according to some embodiments of the disclosure.

FIG. 1 is a diagram that illustrates an example system 100 implementing constrained peak cancellation, according to some embodiments of the disclosure. Example system 100 is provided for the purpose of illustration only and is not limiting of embodiments. System 100 may include wireless, mobile wireless and wireline devices with transmitters supporting OFDM including but not limited to devices designed in accordance with 4th Generation Cellular long term evolution (LTE), 3rd Generation cellular mobile technology (e.g., UMTS/EDGE/CDMA2000), wireless local area networks (WiFi), broadband fixed wireless access networks (WiMAX), mobile broadband Wireless networks (mobile WiMAX), asynchronous digital subscriber lines (ADSL, VDSL), digital video broadcasting-terrestrial (DVB-T) and its extension DVB Handheld (DVB-H), ultra Wideband (UWB), and alternating current (AC) power lines. The example of system 100 includes a tablet 110, laptop 140, smart phone 150, router 120, Internet 130, and base station 160. It is to be appreciated that system 100 may include other electronic devices in addition to or in place of the electronic devices illustrated in FIG. 1 without departing from the scope and spirit of this disclosure.

Figure 2:
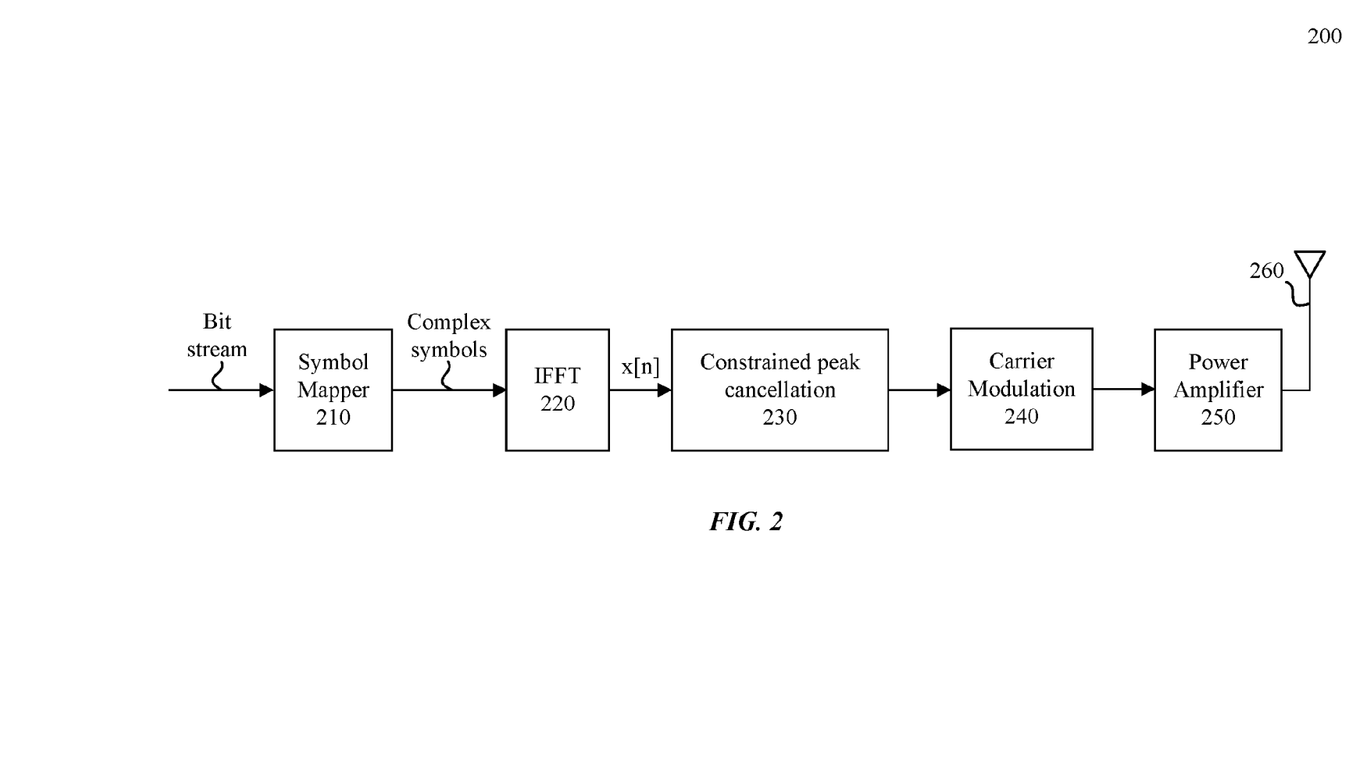
FIG. 2 is a block diagram that illustrates an example system implementing constrained peak cancellation, according to some embodiments of the disclosure.

FIG. 2 is a block diagram that illustrates an example system 200 implementing constrained peak cancellation, according to some embodiments of the disclosure. As a convenience and not a limitation, system 200 is described with respect to elements of FIG. 1. Example system 200 is provided for the purpose of illustration only and is not limiting of embodiments. System 200 may be a transmitter in a device of FIG. 1. System 200 includes symbol mapper 210, IFFT 220, carrier modulation 240, power amplifier 250, and antenna 260. System 200 also includes constrained peak cancellation system 230 that utilizes a center-of-mass of the highest clipping noise peak samples, in-band energy limitations, and/or clipping noise phases of the highest clipping noise samples to shape and constrain cancellation pulses that are subtracted from OFDM symbol samples to reduce PAPR as well as to reduce induced error rates. The cancellation pulse may be used in addition to an out-of-band peak cancelling pulse as would be understood by persons of skill in the art.

Symbol mapper 210 receives a bit stream which is mapped to complex symbols according to a modulation scheme. The complex symbols are provided to IFFT 220 which maps the complex symbols to respective subcarriers before transforming the mapped subcarriers into a time domain signal x[n]. The time domain signal comprises OFDM symbols and each OFDM symbol includes $N_{FFT}$ samples. An OFDM symbol x[n] is received by constrained peak cancellation 230 that determines the M clipping noise sets with the highest peak samples of the OFDM symbol, determines a corresponding cancellation pulse for each of the M sets with the highest peak noise samples, constrained peak cancellation 230 then subtracts the determined cancellation pulses from the OFDM symbol samples to reduce the PAPR of the OFDM symbol. The output of constrained peak cancellation 230 has an acceptable PAPR, and is sent to carrier modulation 240 for modulation. The modulated signal is sent to power amplifier 250 where it is transmitted to a receiver. The reduction of the PAPR reduces the back-offs experienced by power amplifier 250, for example, and thus improves the efficiency of power amplifier 250.

Figure 3A:
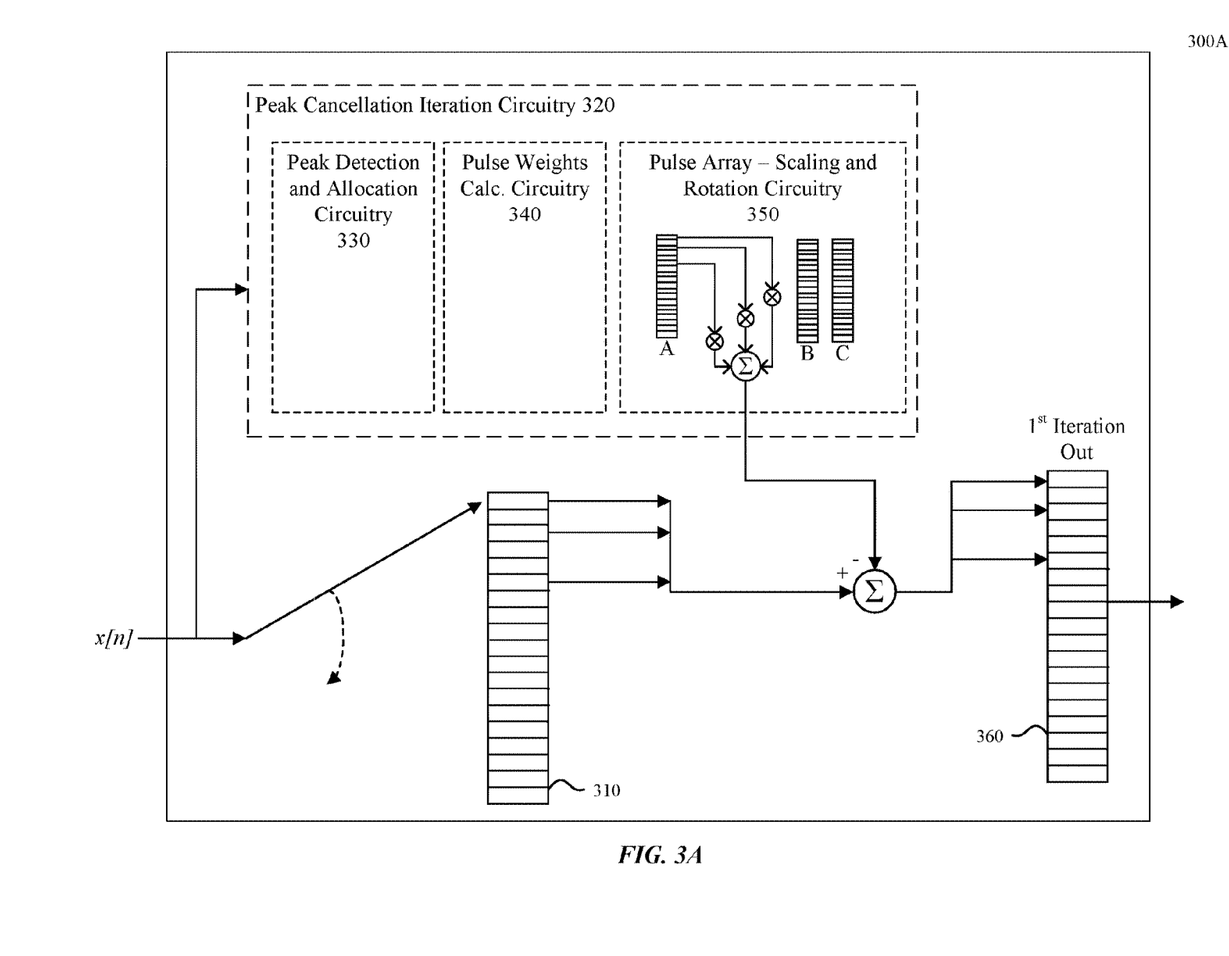
FIGS. 3A and 3B are block diagrams that illustrate example constrained peak cancellation systems, according to some embodiments of the disclosure.
Figure 3B:
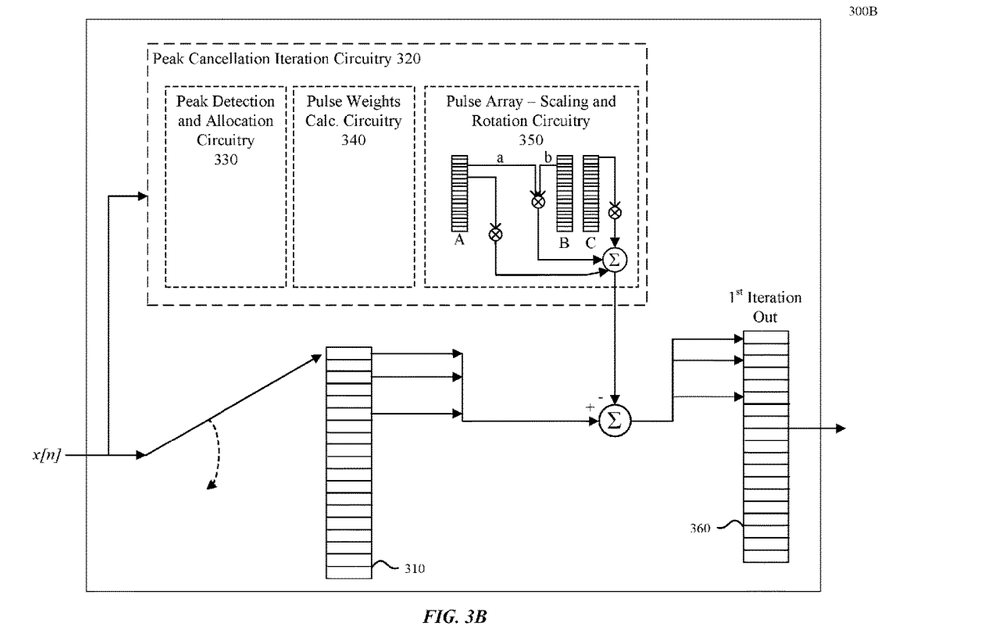

FIGS. 3A and 3B are block diagrams that illustrate example constrained peak cancellation systems 300A and 300B, according to some embodiments of the disclosure. As a convenience and not a limitation, systems 300A and 300B may be described with respect to elements of FIG. 2. Example systems 300A and 300B are provided for the purpose of illustration only and are not limiting of embodiments. Systems 300A and 300B may be performed by one or more components of system 200. It is to be appreciated that not all elements in systems 300A and 300B may be needed to perform the disclosure provided herein, as will be understood by a person of ordinary skill in the art.

System 300A and 300B may be an embodiment of constrained peak cancellation system 230 of FIG. 2, which detects M sets of samples where a set includes one of M highest clipping noise peaks of the OFDM symbol, and determines corresponding weighted cancellation pulses that are used to reduce the PAPR of a received OFDM symbol. System 300 includes peak cancellation iteration circuitry 320 that includes peak detection and allocation circuitry 330, pulse weights calculation circuitry 340, and pulse array—scaling and rotation circuitry 350. System 300 also includes buffer 310 that stores samples of a received OFDM symbol, and buffer 360 that stores samples of the difference between the received OFDM symbol and the weighted cancellation pulses determined by peak cancellation iteration circuitry 320.

Systems 300A and 300B may receive an OFDM symbol x[n] including $N_{FFT}$ samples from IFFT 220 of FIG. 2. Peak detection and allocation circuitry 330 may determine the set of M samples of the OFDM symbol with the highest clipping noise peaks, where M is settable.

Pulse weights calculation circuitry 340 may determine the cancellation pulses for each set of samples determined by circuitry 330. Pulse weights calculation circuitry 340 may determine M weights (e.g., a vector w) for the M instances of the in-band cancellation pulses that will be subtracted from OFDM symbol x[n]. Several metrics are applicable to find the amplitude of the weights—for example, the weights vector w may be chosen to minimize the residual clipping noise energy. For cancellation pulses with energy at data-carrying subcarriers a constraint may be applied on the weights vector w. As an example, $EVM_{CFR}$ may stand for the in-band energy constraint, the EVM budgeted for a crest factor (CF) reduction iteration. The square of CF is equal to the PAPR, (e.g., $CF^2$=PAPR). To avoid exceeding the $EVM_{CFR}$, the minimization may be constrained based on the total energy/amplitude (such as $\|\|w\|\|_1 \leq 1$). The phase of the weight of the cancellation pulse for a set of the M sets of clipping noise samples may be based at least in part on the phase of the samples in the set.

A desired location of the cancellation pulse corresponding to a set of the M sets of the clipping noise samples may be calculated based on the center-of-mass of the clipping noise samples in the set. Based on the calculated location and the constrained complex weight corresponding to a clipping noise peak of the M clipping noise peaks, pulse array scaling and rotation circuitry 350 may be applied to one or more pulses in a bank of possible pulses (e.g., pulses A, B, and C) built on the subcarriers of OFDM symbol x[n]; each of the possible pulses A-C may have a different spectral characteristic, and may be cyclically shifted to a location of a clipping noise set of the M clipping noise sets to create a cancellation pulse. Pulse array scaling and rotation circuitry 350 scales a cancellation pulse (e.g., one or more of pulses A-C) corresponding to a set of the M sets by a respective determined weight, and rotates the corresponding cancellation pulse to the respective location. A determined cancellation pulse signal comprises a sum of the determined correlating cancellation pulses. The determined cancellation pulse signal from each iteration may be saved at pulse array-scaling and rotation circuitry 350 and used in the next iteration. The determined cancellation pulse signal is subtracted from OFDM symbol x[n] to reduce the PAPR and the difference may be stored in buffer 360.

In FIG. 3A, there are three sets of clipping noise peaks (e.g., M=3), and a correlating cancellation pulse may be determined for each of the three sets of clipping noise peaks based on a single stored pulse, pulse A. There are may be more than three peaks, but in the example, M is chosen to address the three worst peaks at each iteration. Pulse A may be applied up to M times, three times in this example. Each instance of a cancellation pulse based on pulse A is created by reading samples of pulse A starting from an address locating a clipping noise peak (for each of the 3 sets) at each desired location such that 3 correlating cancellation pulses are generated. In FIG. 3B, there are also three sets of clipping noise peaks (e.g., M=3), and each correlation cancellation pulse may be determined for each of the three sets based on the same or different stored pulses. The bank of pulses saved in memory includes pulses A, B, and C that may be different. For example, the pulses A-C may be built on different subcarriers and have different spectral properties that may be applied up to 3 times. In FIG. 3B, pulses A, B, and C are applied to generate three different correlating cancellation pulses that are subtracted from OFDM symbol x[n] to reduce the PAPR. Note that one of the correlating cancellation pulses is based on a combination pulse A and pulse B where their contributions are shown as a and b, respectively. In some embodiments, each set of clipping noise samples of the M sets may be cancelled by a combination of different pulses.

Figure 4:
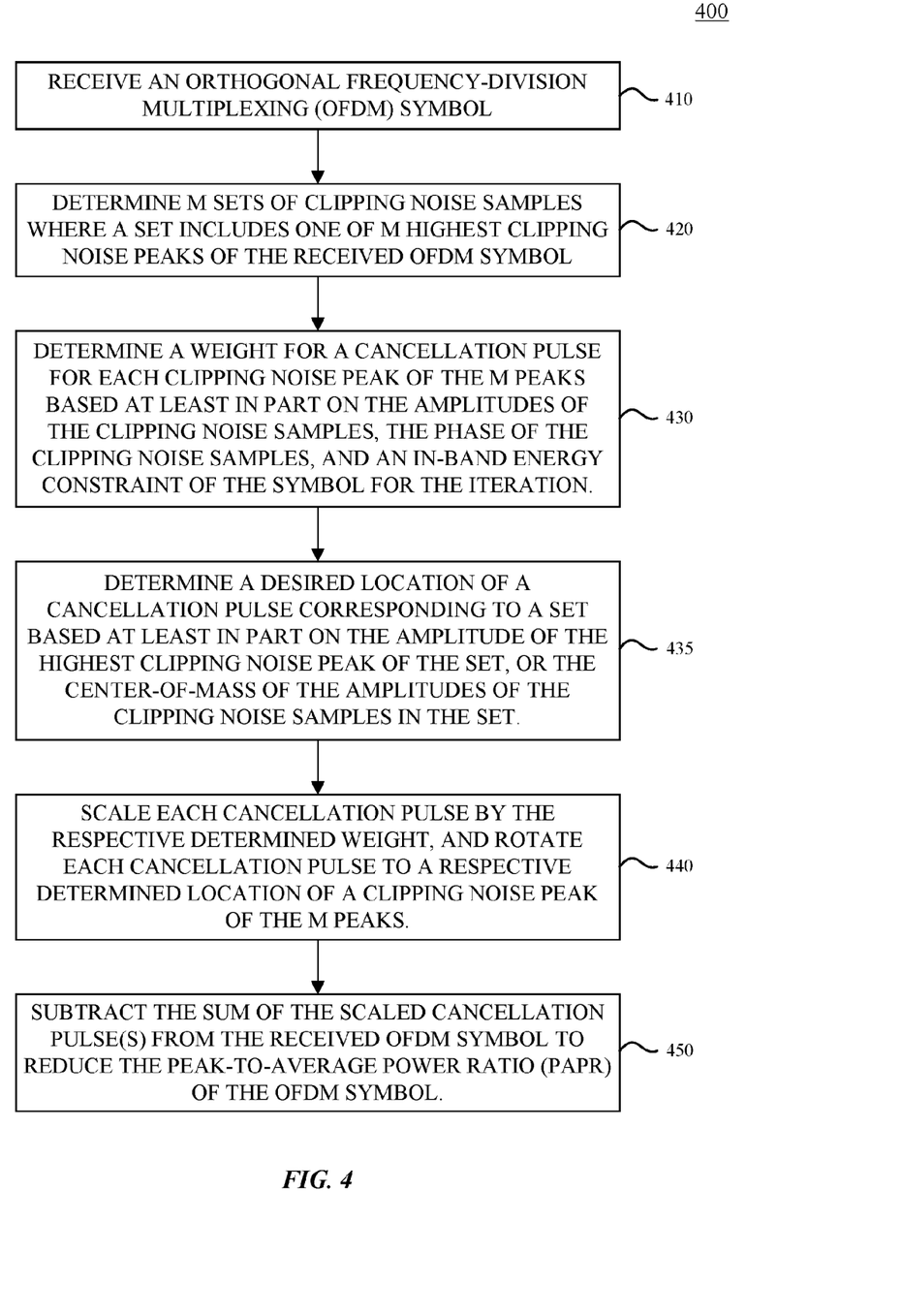
FIG. 4 illustrates an example process for constrained peak cancellation, according to some embodiments of the disclosure.

FIG. 4 illustrates an example process 400 for constrained peak cancellation, according to some embodiments of the disclosure. As a convenience and not a limitation, process 400 may be described with respect to elements of FIGS. 2, 3, and 5. Example process 400 is provided for the purpose of illustration only and is not limiting of embodiments. Process 400 may be performed by one or more components of system 200. It is to be appreciated that not all steps may be needed to perform the disclosure provided herein. Further, some of the steps may be performed simultaneously, or in a different order than shown in FIG. 4, as will be understood by a person of ordinary skill in the art.

Figure 5:
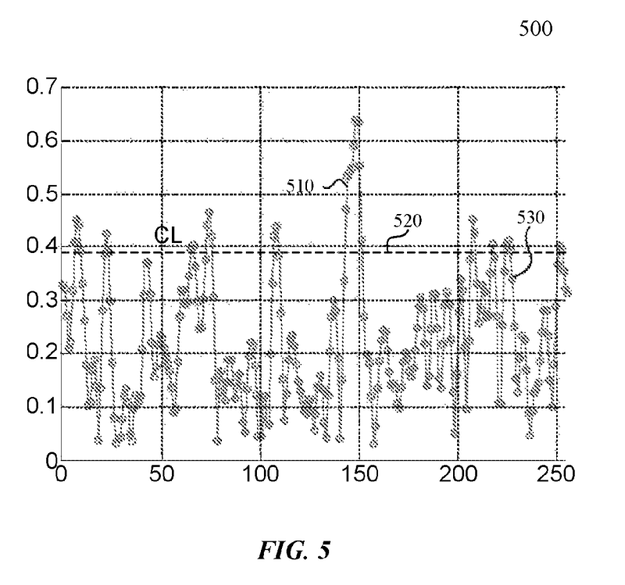
FIG. 5 illustrates an example graph of an OFDM symbol, according to some embodiments of the disclosure.

At 410, process 400 receives an OFDM symbol. FIG. 5 illustrates an example graph 500 of an OFDM symbol according to some embodiments of the disclosure. Graph 500 includes the amplitude of samples of OFDM symbol 510 and clipping level (CL) 520. OFDM symbol 510 includes N samples, one of which is shown as sample 530. To reduce the PAPR, the amplitude of the samples of OFDM symbol 510 should satisfy CL 520, a settable amplitude threshold value. For example, to satisfy CL 520, the amplitude of a sample of OFDM symbol 510 may be less than or equal to a value of CL 520. Thus, the samples above the CL may be considered as noise. For example, OFDM symbol 510 received from IFFT 220 of FIG. 2 includes NFFT samples.

At 420, process 400 determines M sets of clipping noise samples where a set includes one of M highest clipping noise peaks of the received OFDM symbol. In the example, $N_{FFT}$ samples of OFDM symbol 510 are analyzed in an iteration to determine a set of M highest clipping noise peaks of the received OFDM symbol 510, where M is settable. The M highest clipping noise peaks may be determined by identifying peak candidates whose amplitudes satisfy a settable amplitude threshold value (e.g., identifying samples that exceed a clipping level (CL) 520), sorting the peaks by the total clipping noise energy and selecting the highest M peaks. In some embodiments, the highest clipping noise peaks may be found by analyzing the samples of the OFDM symbol, recording each clipping noise peak found, and designating the peak for cancellation if the number of peaks found is less than M or if the clipping noise energy of the peak is greater than any of the previous M peaks. M sets of highest clipping noise peaks are determined where each set includes clipping noise samples that make up the peak.

The amplitude of the highest clipping noise peak in a set may be used to determine the preferred location for a clipping noise cancellation pulse corresponding to the highest clipping noise peak. The desired location of the cancellation pulse for each of the M clipping noise peaks may be found by the location of the highest clipping point amplitude in a set, or by the center-of-mass of the clipping noise amplitude/energy of the set. The phase of the clipping noise for a highest clipping noise peak of the set may be used to determine the phase of the weights for a correlating cancellation pulse.

At 430, process 400 determines a weight for a cancellation pulse for each clipping noise peak of the M peaks based at least in part on the amplitudes of the clipping noise samples, the phase of the clipping noise samples, and an in-band energy constraint of the symbol for the iteration.

At 435, process 400 determines a desired location of a cancellation pulse corresponding to a set based at least in part on an amplitude of the highest clipping noise peak of the set, or the center-of-mass of the amplitudes of the clipping noise samples in the set.

For example, process 400 may determine the desired location and the complex weight for a cancellation pulse corresponding to a clipping noise peak of a set of the M highest/worst clipping noise peaks based at least in part on a center-of-mass of a set, a clipping noise phase of the samples in the set, and on an in-band energy constraint of the symbol for the iteration. In the example iteration, a weight for the cancellation pulse, p[n], may be determined for a peak of a set of M sets. A cancellation pulse p[n] may be scaled based at least in part on a controlled amount of energy of the in-band constraint (e.g., an error vector magnitude (EVM) of the symbol) budgeted for the iteration. For example, a cancellation pulse p[n] is depicted below:

$$p[n] = \frac{1}{NFFT} \cdot \sum_{k \in \{Data\ Bins\}} e^{j\frac{2\pi kn}{NFFT}}$$

When the average energy of the symbol subcarriers is α, M instances of a cancellation pulse p[n] designated for cancellation of M clipping noise peaks may be scaled by weights vector w chosen to minimize the residual clipping noise energy at the proximity of the existing clipping peaks under the constraint:

$$\sum_{m=1}^{M} |w_m| \leq \sqrt{\alpha} \cdot lin20(EVM_{CFR})$$

where $EVM_{CFR}$ is the in-band energy constraint.

The locations for the M cancellation pulses may be the locations of the highest clipping noise samples in each peak, or the locations may be based on clipping noise peak center-of-mass. For example, for cancellation pulse in for the clipping noise peak $c_m$ at locations $l_m$ the desired location may found by:

$$\frac{|c_m|^t \cdot l_m}{\sum |c_m|}$$

While the phase of the weight may be the phase of the highest clipping noise sample in each set, or the phase may be the approximated phase for the center-of-mass sample of the peak, for example, nearest or linear approximations may be used.

At 440, process 400 scales each cancellation pulse by the respective determined weight, and rotates each cancellation pulse to a respective determined location of a clipping noise peak of the M clipping noise peaks. Cyclic rotation is used in order to preserve the spectral characteristics of the cancellation pulse.

At 450, process 400 subtracts the sum of the scaled cancellation pulse(s) from the received OFDM symbol to reduce the PAPR of the OFDM symbol. In the example, the scaled cancellation pulses are subtracted from the received OFDM symbol 510 to reduce the PAPR of the OFDM symbol. Process 400 ends.

Figure 6:
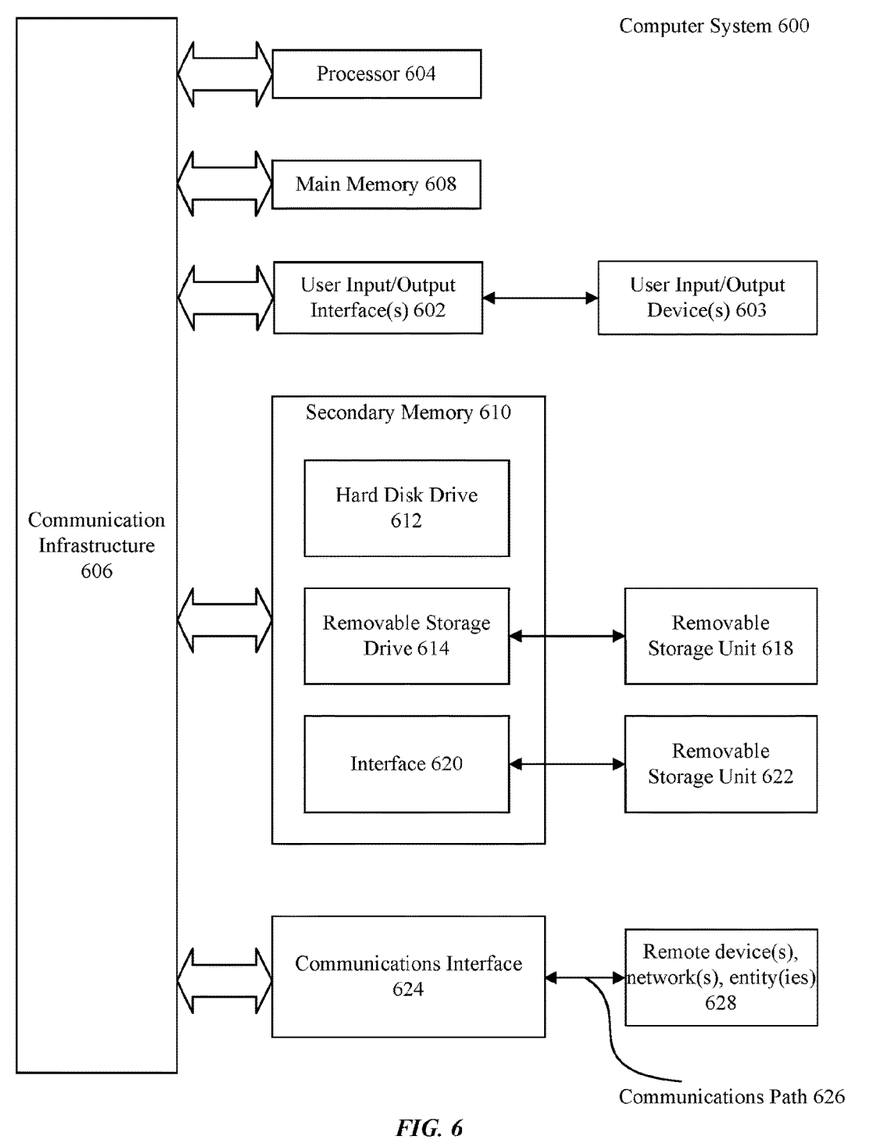
FIG. 6 is an example computer system for implementing various embodiments.

Various embodiments can be implemented, for example, using one or more well-known computer systems, such as computer system 600 shown in FIG. 6. Computer system 600 can be any well-known computer capable of performing the functions described herein. For example, and without limitation, elements 110, 140, 150, 230, (and/or other apparatuses and/or components shown in the figures) may be implemented using computer system 600, or portions thereof.

Computer system 600 includes one or more processors (also called central processing units, or CPUs), such as a processor 604. Processor 604 is connected to a communication infrastructure or bus 606.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding embodiments can be implemented in a wide variety of configurations and architectures. Therefore, some or all of the operations in the preceding embodiments may be performed in hardware, in software or both. For example, at least some of the operations may be implemented using firmware in communications interface 624 and/or the PHY layer of communications interface 624, such as hardware in an interface circuit.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, process, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A system for peak-cancellation, comprising:
a memory; and
a processor, communicatively coupled to the memory, configured to:
receive an Orthogonal Frequency Division Multiplexing (OFDM) symbol;
identify M sets of samples of the received OFDM symbol, wherein a first set of the M sets includes a first clipping noise peak of a target M clipping noise peaks;
determine a weight of a first cancellation pulse corresponding to the first clipping noise peak based at least in part on: an amplitude of the first set, a phase of the first set, and an in-band energy constraint;
determine a location of the first cancellation pulse based at least in part on: an amplitude of the first clipping noise peak, or a center-of-mass of amplitudes of first clipping noise samples of the first set;
determine a cancellation signal based at least on the determined weight and the determined location of the first cancellation pulse; and
combine the cancellation signal with the received OFDM symbol to reduce a peak-to-average power ratio (PAPR) of the received OFDM symbol.

2. The system of claim 1, wherein to determine the cancellation signal, the processor is configured to:
cyclically shift the first cancellation pulse to the determined location;
scale the first cancellation pulse by the determined weight; and
sum the cyclically shifted and scaled first cancellation pulse with M−1 other cyclically shifted and scaled corresponding cancellation pulses.

3. The system of claim 2, wherein the processor is configured to calculate the determined weight, and weights of the M−1 other cyclically shifted and scaled corresponding cancellation pulses comprising:

$$\sum_{m=1}^{M} |w_m| \leq \sqrt{\alpha} \cdot lin20(EVM_{CFR})$$

wherein α is an average energy of subcarriers of the received OFDM symbol, and $EVM_{CFR}$ is an error vector magnitude budget designated for PAPR reduction.

4. The system of claim 1, wherein to determine the location of the first cancellation pulse based at least in part on the center-of-mass of the amplitudes of the first clipping noise samples of the first set, the processor is configured to determine the following:

$$\frac{|c|^t \cdot l}{\sum |c|}$$

wherein (c) comprises amplitudes of the first clipping noise samples of the first set, and (l) comprises corresponding locations of the first clipping noise samples of the first set.

5. The system of claim 1, wherein the processor is further configured to determine a phase of the determined weight of the first cancellation pulse.

6. The system of claim 5, wherein to determine the phase, the processor is configured to:
preserve a phase of the first clipping noise peak; or
determine a phase of the center-of-mass of the amplitudes of the first clipping noise samples of the first set by approximation.

7. The system of claim 6, wherein the approximation comprises a nearest approximation or a linear approximation.

8. A method for peak cancellation, comprising:
receiving an Orthogonal Frequency Division Multiplexing (OFDM) symbol;
identifying M sets of samples of the received OFDM symbol, wherein a first set of the M sets includes a first clipping noise peak of a target M clipping noise peaks;
determining a weight of a first cancellation pulse corresponding to the first clipping noise peak based at least in part on: an amplitude of the first set, a phase of the first set, and an in-band energy constraint, wherein the in-band energy constraint comprises an error vector magnitude (EVM);
determining a location of the first cancellation pulse based at least in part on: an amplitude of the first clipping noise peak, or a center-of-mass of amplitudes of first clipping noise samples of the first set;
determining a cancellation signal based at least on the determined weight and the determined location of the first cancellation pulse; and
combining the cancellation signal with the received OFDM symbol to reduce a peak-to-average power ratio (PAPR) of the received OFDM symbol.

9. The method of claim 8, wherein the determining the cancellation signal comprises:
cyclically shifting the first cancellation pulse to the determined location;
scaling the first cancellation pulse by the determined weight; and
summing the cyclically shifted and scaled first cancellation pulse with M−1 other cyclically shifted and scaled corresponding cancellation pulses.

10. The method of claim 9, comprising calculating the determined weight, and weights of the M−1 other cyclically shifted and scaled corresponding cancellation pulses comprising:

$$\sum_{m=1}^{M} |w_m| \leq \sqrt{\alpha} \cdot lin20(EVM_{CFR})$$

wherein α is an average energy of subcarriers of the received OFDM symbol, and $EVM_{CFR}$ is an error vector magnitude budget designated for PAPR reduction.

11. The method of claim 8, wherein the determining the location of the first cancellation pulse based at least in part on the center-of-mass of the amplitudes of the first clipping noise samples of the first set comprises determining the following:

$$\frac{|c|^t \cdot l}{\sum |c|}$$

wherein (c) comprises amplitudes of clipping noise samples of the first set, and (l) comprises corresponding locations of the clipping noise samples of the first set.

12. The method of claim 8, further comprising determining a phase of the determined weight of the first cancellation pulse.

13. The method of claim 12, wherein determining the phase comprises:
preserving a phase of the first clipping noise peak; or
determining a phase of the center-of-mass of the amplitudes of the first clipping noise samples of the first set by approximation.

14. The method of claim 13, wherein the approximation comprises a nearest approximation or a linear approximation.

15. A non-transitory computer-readable medium having instructions stored therein, which when executed by a processor cause the processor to perform peak cancellation operations, the operations comprising:
receiving an Orthogonal Frequency Division Multiplexing (OFDM) symbol;
identifying M sets of samples of the received OFDM symbol, wherein a first set of the M sets includes a first clipping noise peak of a target M clipping noise peaks;
determining a weight of a first cancellation pulse corresponding to the first clipping noise peak based at least in part on: an amplitude of the first set, a phase of the first set, and an in-band energy constraint, wherein the in-band energy constraint comprises an error vector magnitude (EVM);
determining a location of the first cancellation pulse based at least in part on a center-of-mass of amplitudes of first clipping noise samples of the first set;
determining a cancellation signal based at least on the determined weight and the determined location of the first cancellation pulse; and
combining the cancellation signal with the received OFDM symbol to reduce a peak-to-average power ratio (PAPR) of the received OFDM symbol.

16. The non-transitory computer-readable medium of claim 15, wherein the determining the cancellation signal comprises:
cyclically shifting the first cancellation pulse to the determined location;
scaling the first cancellation pulse by the determined weight; and
summing the cyclically shifted and scaled first cancellation pulse with M−1 other cyclically shifted and scaled corresponding cancellation pulses.

17. The non-transitory computer-readable medium of claim 16, the operations further comprising calculating the determined weight, and weights of the M−1 other cyclically shifted and scaled corresponding cancellation pulses comprising:

$$\sum_{m=1}^{M} |w_m| \leq \sqrt{\alpha} \cdot lin20(EVM_{CFR})$$

wherein $\alpha$ is an average energy of subcarriers of the received OFDM symbol, and $EVM_{CFR}$ is an error vector magnitude budget designated for PAPR reduction.

18. The non-transitory computer-readable medium of claim 15, wherein the determining the location of the first cancellation pulse based at least in part on the center-of-mass of the amplitudes of the first clipping noise samples of the first set comprises determining the following:

$$\frac{|c|^t \cdot l}{\sum |c|}$$

wherein (c) comprises amplitudes of clipping noise samples of the first set, and (l) comprises corresponding locations of the clipping noise samples of the first set.

19. The non-transitory computer-readable medium of claim 15, the operations further comprising determining a phase of the determined weight of the first cancellation pulse.

20. The non-transitory computer-readable medium of claim 19, wherein the determining the phase comprises:
preserving a phase of the first clipping noise peak; or
determining a phase of the center-of-mass of the amplitudes of the first clipping noise samples of the first set by approximation.

* * * * *